(12) United States Patent
Rodrigues

(10) Patent No.: US 8,513,338 B2
(45) Date of Patent: Aug. 20, 2013

(54) BINDER COMPOSITION AND ASPHALT MIXTURE

(75) Inventor: Catherine Rodrigues, Colombes Cedex (FR)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/319,254

(22) PCT Filed: May 6, 2010

(86) PCT No.: PCT/EP2010/056186
§ 371 (c)(1),
(2), (4) Date: Feb. 8, 2012

(87) PCT Pub. No.: WO2010/128105
PCT Pub. Date: Nov. 11, 2010

(65) Prior Publication Data
US 2012/0129985 A1    May 24, 2012

(30) Foreign Application Priority Data
May 7, 2009  (EP) ...................................... 09305413

(51) Int. Cl.
*C08L 93/00*  (2006.01)

(52) U.S. Cl.
USPC ............. 524/77; 524/272; 524/312; 525/54.4

(58) Field of Classification Search
USPC ............... 524/60, 61, 77, 272, 312; 525/54.4
See application file for complete search history.

(56) References Cited

U.S. PATENT DOCUMENTS

| | | | |
|---|---|---|---|
| 3,985,694 A | 10/1976 | Petrucco et al. | 260/28.5 |
| 4,767,813 A | 8/1988 | Evitt | 524/272 |
| 5,130,354 A | 7/1992 | Gelles | 524/68 |
| 6,380,320 B1 | 4/2002 | Wong | 525/285 |
| 7,501,468 B2 | 3/2009 | Stumphauzer et al. | 524/474 |
| 7,670,420 B2 * | 3/2010 | Ballie et al. | 106/220 |
| 8,076,399 B2 * | 12/2011 | Laurens et al. | 524/77 |
| 2006/0183823 A1 | 8/2006 | Saidman | 524/47 |
| 2008/0167421 A1 | 7/2008 | Yalvac et al. | 524/570 |

FOREIGN PATENT DOCUMENTS

| | | |
|---|---|---|
| CN | 1800287 | 7/2006 |
| EP | 0179510 | 9/1985 |
| EP | 304767 | 1/1988 |
| EP | 543246 | 5/1993 |
| EP | 1184423 | 3/2002 |
| EP | 1466878 | 10/2004 |
| EP | 1263874 | 5/2005 |
| FR | 1397965 | 3/1965 |
| FR | 2765232 | 12/1998 |
| JP | 52087428 | 7/1977 |
| JP | 60115653 | 6/1985 |
| JP | 02063828 | 3/1990 |
| JP | 10219214 | 2/1997 |
| JP | 2004300207 | 10/2004 |
| WO | WO8906259 | 7/1989 |
| WO | WO9216580 | 10/1992 |
| WO | WO2005000968 | 1/2005 |
| WO | WO2006041550 | 4/2006 |

OTHER PUBLICATIONS

EPO, European Search Report dated Oct. 20, 2009, Application No. 09305413.8-2109, filed May 9, 2009.
PCT International Search Report and Written Opinion dated Jul. 1, 2010, International Application No. PCT/EP2010/056186 filed May 6, 2010.

\* cited by examiner

*Primary Examiner* — Peter Szekely
(74) *Attorney, Agent, or Firm* — Charles W. Stewart

(57) ABSTRACT

A binder composition and a mixture of the binder composition and aggregate that are suitably used to prepare pavements are disclosed. The binder composition comprises a resin of vegetable origin, an oil of vegetable and a polymer, and the polymer is functionalised with silane groups.

30 Claims, No Drawings

BINDER COMPOSITION AND ASPHALT MIXTURE

PRIORITY CLAIM

The present application claims priority from PCT/EP2010/056186, filed 6 May 2010, which claims priority from European Application 09305413.8, filed 7 May 2009.

FIELD OF THE INVENTION

The invention relates to a binder composition and an asphalt mixture that are suitably used to prepare asphalt pavements.

BACKGROUND OF THE INVENTION

Road surfaces (known as pavements) are routinely constructed from asphalt mixture, which is a composite of binder and aggregate. For most pavements, the binder is bitumen, a viscous liquid or a solid consisting essentially of hydrocarbons and their derivatives. However, in recent years synthetic binders have also been used. Synthetic binders, such as Shell's Mexphalte C® possess similar rheological and mechanical properties to the bituminous binders typically used in road applications. The synthetic binders are typically clear, so they are readily pigmented and can be used to obtain coloured asphalt mixture. The synthetic binders can also be used in other applications, such as roofing, waterproofing or sealing applications, e.g. the synthetic binders can be used to seal the gaps between paving stones.

EP 179 510 discloses synthetic binders comprising resin, oil and, optionally, polymer. The resin is a petroleum resin or coumarone-indene resin that contains carboxylic acid, carboxylic acid anhydride or hydroxyl groups. The oil is preferably a mineral lubricating oil extract such as Bright-Stock extract, and the polymer may be a synthetic rubber such as styrene-butadiene-styrene. The use of modified resins containing carboxylic acid, ductility and adhesion properties of the binder compositions.

EP 1 466 878 discloses synthetic binders comprising resin and oil. The resin and oil are renewable raw materials of vegetable origin. The binders of EP 1 466 878 do not comprise polymer. Indeed the absence of any natural or synthetic elastomer and of any thermoplastic polymer is an essential feature of the binders of EP 1 466 878.

The present inventors have sought to provide an alternative synthetic binder composition. Preferably the binder has improved adhesion properties and preferably the binder uses renewable raw materials.

SUMMARY OF THE INVENTION

Accordingly, the present invention provides a binder composition comprising a resin of vegetable origin, an oil of vegetable origin and a polymer, wherein the polymer is functionalised with silane groups.

The present inventors have found that using such a functionalised polymer in a binder composition comprising a resin of vegetable origin and an oil of vegetable origin improves the adhesion properties of the binder composition.

In a further aspect, the present invention provides an asphalt mixture comprising the binder composition according to the invention and aggregate.

The binder composition and asphalt mixture of the invention are suitably used in processes for preparing road surfaces, but may also be used in other applications, e.g. in roofing, waterproofing or sealing applications.

Preferred features of the invention will be apparent from the following description and in parituclar from the appended claims.

DETAILED DESCRIPTION OF THE INVENTION

Resins of vegetable origin are a renewable resource and are typically clear, so can be used to prepare a clear binder. The resin may be used as such, or may have been modified chemically. The term "resin of vegetable origin" in the present description is used to describe both resins as such ("natural resins") and resins that have been modified chemically ("modified resins"). The term "resin of vegetable origin" does not include synthetic resins derived from petroleum feedstocks such as polyester resins and epoxy resins. Preferably the resin is chosen from the group consisting of rosin esters, natural rosins, metal resinates, copal resins, accroid and dammar. More preferably the resin is a rosin ester. Most preferably the resin is the pentaerythitol ester of rosin.

The resin preferably has a softening point, as measured according to ISO 4625, of greater than 40° C. and less than 200° C., more preferably of greater than 80° C. and less than 180° C.

The oil of vegetable origin is an oil derived from a plant, that may or may not have been further modified by chemical or physical processes. Preferably the oil is derived from the plant and has not been subjected to further chemical modification. Vegetable oils are a renewable resource and are typically very clear, particularly if a refined vegetable oil is used, so can be used to prepare a clear binder. Vegetable oils can usually be transported cold (typically vegetable oils flow at ambient temperatures) and the product quality of vegetable oils is generally consistent. Preferably the oil is chosen from the group consisting of rapeseed oil, palm oil, tall oil, soybean oil, sunflower oil, peanut oil, cottonseed oil, olive oil, corn oil, linseed oil, rice bran oil, safflower oil, sesame oil, flax oil, ground nut oil, coconut oil and palm kernel oil. More preferably the oil is chosen from rapeseed oil, palm oil and tall oil. Most preferably the oil is rapeseed oil. Rapeseed oil is very clear, and has no smell. The vegetable oil may be used in a raw, used or refined form, and may have been modified chemically, e.g. by esterification.

The oil preferably has a viscosity, as measured according to EN12595 at 100° C., of greater than 2 cSt ($2 \times 10^{-6}$ m$^2$/s) and less than 200 cSt ($2 \times 10^{-4}$ m$^2$/s), more preferably of greater than ScSt ($5 \times 10^{-6}$ m$^2$/s) and less than 100 cSt ($1 \times 10^{-4}$ m$^2$/s).

The preferred amounts of resin and oil in the binder vary with the properties (particularly the viscosity and the softening point) of the resin and the oil. It is preferred to maximise the amount of oil because typically this is the least expensive component in the binder. However, if the amount of oil is too high (and the amount of resin is too low) the binder composition is likely to be too soft and insufficiently viscous. If the amount of resin is too high (and the amount of oil is too low), the cost of the binder composition is likely to be high and the binder composition is likely to be too hard and too viscous.

The amount of resin in the binder is preferably greater than 10 wt % (based upon the weight of the binder), more preferably greater than 20 wt %, most preferably greater than 30 wt %. The amount of resin in the binder is preferably less than 95 wt % (based upon the weight of the binder), more preferably less than 90 wt %, most preferably less than 85 wt %. The amount of resin in the binder is preferably in the range of greater than 20 wt % to less than 95 wt %, more preferably in the range of greater than 30 wt % to less than 85 wt %. The amount of oil in the binder is preferably greater than 3 wt % (based upon the weight of the binder), more preferably greater than 10 wt %. The amount of oil in the binder is preferably less than 90 wt % (based upon the weight of the binder), more preferably less than 80 wt %. The amount of oil in the binder is preferably in the range of greater than 10 wt % to less than 80 wt %. If the oil is a vegetable oil, the amount of resin in the binder is preferably in the range of greater than 60 wt % to less than 90 wt % and the amount of vegetable oil in the binder is preferably in the range of greater than 10 wt % to less than 30 wt %.

The polymer is functionalised with silane groups. Preferably the silane groups are grafted onto the polymer. Alternatively, the functionalised polymer may be prepared by a copolymerisation process wherein silane monomers and other monomers are copolymerised.

Silanes that are suitable for grafting onto polymers have the general formula $RR'_nSiY_{3-n}$, where n is 0, 1 or 2, where R is a non-hydrolysable organic group which is capable of grafting onto the polymer, R' is a non-hydrolysable organic group incapable of grafting onto the polymer and Y is a hydrolysable organic group. Preferred R groups are vinyl, allyl, butenyl, cyclohexenyl, cyclopentadienyl, methacryl, or methacryloxyalkyl (e.g. methacryloyloxypropyl), most preferably vinyl. Preferred Y groups are alkoxy groups (e.g. methoxy, ethoxy, butoxy), acyloxy groups (e.g. formyloxy, acetoxy, propionoxy), oxime groups (e.g. $—ON—C(CH_3)_2$ or $—ON—C(C_6H_5)_2$, alkylamino and arylamino groups, more preferably alkoxy, most preferably methoxy or ethoxy. Preferably n is 0. Preferred silane compounds are vinyltrimethoxysilane and vinyltriethoxysilane.

The amount of silane grafted onto the polymer is preferably from 0.1 wt % to 5 wt % based upon the weight of the polymer, more preferably from 0.15 wt % to 2.5 wt %.

The silane may be grafted onto a polymer by a free radical reaction. The silane and a free radical initiator such as an organic peroxide, peracid, perester or peracetal are added to the polymer. Preferred free radical initiators include dicumyl peroxide, 2,5-dimethyl-2,5-ditertbutylperoxyhexane and α,α(ditertbutylperoxyisopropyl)benzene. Preferably from 0.01 wt % to 0.5 wt % of free radical initiator is added to the polymer, based upon the weight of the polymer. Methods of polymer grafting are disclosed in WO 96/00656.

The silane-functionalised polymer is preferably a thermoplastic elastomer or plastomer. Preferably the polymer is a silane-functionalised olefinic polymer or copolymer such as silane-functionalised polyethylene, polypropylene, polybutadiene or polystyrene, or silane-functionalised ethylene vinyl acetate (EVA). Most preferably the polymer is silane-functionalised EVA.

The amount of functionalised polymer in the binder is preferably greater than 0.1 wt % (based upon the weight of the binder), more preferably greater than 1 wt % and most preferably greater than 1.5 wt %. The amount of functionalised polymer in the binder is preferably less than 20 wt % (based upon the weight of the binder), more preferably less than 10 wt % and most preferably less than 6 wt %. The amount of functionalised polymer in the binder is preferably in the range of greater than 1 wt % to less than 10 wt %, most preferably in the range of greater than 1.5 wt % to less than 6 wt %. It is preferred that the amount of functionalised polymer is within these ranges because a larger amount of polymer increases expense and could lead to poor storage stability, and because a smaller amount of polymer may provide a binder with insufficient adhesion and insufficient strength.

The binder composition may comprise polymer in addition to the functionalised polymer. The binder composition may comprise a natural or synthetic rubber, such as a copolymer of styrene and a conjugated diene (e.g. butadiene or isoprene) or a homopolymer of a conjugated diene (e.g. butadiene). The binder may comprise ethylene vinyl acetate (EVA), i.e. EVA that is not functionalised.

The binder composition may comprise further additives, e.g. softening agents such as wax or penetration index boosters such as waxes, polyphosphoric acid and ethylene polymers.

The binder composition preferably comprises a clear resin and a clear oil, and is therefore preferably clear. In one embodiment of the invention, pigments are incorporated into the binder composition so that it can be used to prepared coloured surfaces. Alternatively, the binder can be used in its clear form to prepare asphalt wherein the colour of the aggregate is visible.

The binder composition may be incorporated into an aqueous emulsion, comprising the binder composition, water and one or more additives to assist in the formation and stabilisation of the emulsion. Suitable additives are known to the skilled person and may include cationic emulsifiers such as monoamines, diamines, quaternary ammonium compounds, alkoxylated amines or amidoamines; anionic emulsifiers such as fatty acids or sulphonates; non-ionic emulsifiers such as nonylphenolethyoxylates, ethoxylated fatty acids or ethoxylized secondary alcohol bases; or clays such as natural or processed clays and bentonites. The aqueous emulsion preferably comprises from 40 to 70 wt % of the binder composition, from 60 to 30 wt % water and from 3 to 10 wt % of emulsifying agent, based upon the weight of the emulsion. The aqueous emulsion may further comprise a polymer that has been incorporated in the form of a latex (an aqueous dispersion of polymer), e.g. a latex of styrene-butadiene rubber, a latex of styrene-butadiene-styrene or a latex of polychloroprene.

Asphalts mixtures are essentially made of binder with aggregate, in particular filler, sand and stones. There are many different types of asphalts available and their characteristics can vary quite significantly. The design of asphalts for paving application is largely a matter of selecting and proportioning materials to obtain the desired properties in the finished construction. The design of the asphalt mixture is typically based on the grading of aggregates and asphalt mixtures are usually classified into dense graded, gap graded and open graded.

The asphalt mixture of the invention may fall into any of these categories.

The amount of binder in the asphalt mixture of the present invention will vary depending on the application for which the asphalt is to be used. However, the asphalt mixture used in the present invention preferably comprises in the range of from 1 to 20 wt % of the binder, more preferably in the range of from 2 to 10 wt %, and most preferably in the range from 3 to 7 wt %, based on total weight of asphalt. For a mastic asphalt, the asphalt mixture preferably comprises from 10 to 15 wt % of the binder.

The present invention further provides an asphalt pavement comprising a binder composition or asphalt mixture according to the invention, and a process for preparing an asphalt pavement using a binder composition or asphalt mixture according to the invention.

The binder composition of the invention may be prepared by heating the resin, oil and functionalised polymer, e.g. to a temperature greater than 130° C., and mixing. Preferably the oil is heated, e.g. to about 160° C., the resin is added gradually whilst the temperature is maintained, e.g. at about 140° C., and then the polymer is added whilst the blend is sheared.

An aqueous emulsion of the binder composition may be prepared using techniques known to the person skilled in the art, e.g those disclosed in EP 1 184 423. Preferably the binder composition is heated so that it melts, and an emulsifying solution comprising water and emulsifying agent is added to the molten binder composition. The emulsifying solution and molten binder are mixed under high shear (e.g. in a colloid mill) to form an emulsion.

The asphalt mixture of the invention may be prepared by combining a binder composition of the invention with aggregate. In one embodiment of the invention, the asphalt mixture composition is prepared in a hot mix process wherein aggregate is heated to a temperature of at least 120° C., preferably at least 140° C. and a binder is added to the aggregate. In another embodiment of the invention, the asphalt mixture composition is prepared in a cold mix process, wherein aggregate and an aqueous emulsion of a binder are mixed at a temperature of less than 80° C., preferably at ambient temperature.

The asphalt mixture can be used to form asphalt pavement in conventional pavement-laying processes.

EXAMPLES

The invention will now be described by reference to examples which are not intended to be limiting of the invention.

Preparation of Binders

Three clear binders based upon resin and oil of vegetable origin were prepared. Comparative Example 1 contained no polymer and Comparative Example 2 contained conventional ethylene-vinyl acetate (Polybilt 106 from Exxon). A binder according to the invention (Example 1) contained silane grafted ethylene-vinyl acetate (Arkema).

The oil (rapeseed oil) was placed in a can. The oil was heated and the resin (pentaerythritol ester of rosin) was added gradually. The can was stored in an oven at 140° C. until the resin dissolved in the oil. The can was transferred onto a heating plate at 140-145° C. and agitated under low shear. For the polymer-containing blends, polymer was then added progressively over a few minutes. The blend was agitated until the polymer dissolved completely (this typically took more than one hour). Dissolution of the polymer was assessed visually.

The composition of the clear binders is shown in table I:

TABLE I

|  | Rapeseed oil (wt %) | Rosin (pentaerythritol ester of rosin) (wt %) | Polymer (wt %) |
| --- | --- | --- | --- |
| Comparative Example 1 | 20 | 80 | 0 |
| Comparative Example 2 | 20 | 77 | 3 (conventional EVA) |
| Example 1 | 20 | 77 | 3 (silane grafted EVA) |

Adhesion Tests

Passive adhesion on four different types of stones (quartzite, flint, diorite, limestone) was measured according to the AFNOR XP T 66-043 standard. In this method, aggregates are mixed with binder (100 g stones and 5 g binder). The mix is left for 16 hours in water in an oven at 60° C. The adhesion is qualitatively assessed by observing the relative surface of stones still covered by the binder at the end of the test.

Table II shows the adhesion results (% of stones covered by binder after 16 hours in water at 60'C.) for comparative examples 1 and 2, examples 1 and 2, and also for a commercially available clear binder (comparative example 3, Mexphalte C® from Shell).

TABLE II

|  | Quartzite | Flint | Diorite | Limestone |
| --- | --- | --- | --- | --- |
| Comparative Example 1 | 90 | 90 | <50 | 90 |
| Comparative Example 2 | 90 | 90 | 50 | 90 |
| Example 1 | 90 | 90 | 90 | 90 |
| Comparative Example 3 | 100 | 100 | 90 | 100 |

The adhesion to quartzite, flint and limestone for the binder of the invention is similar to the adhesion for the comparative examples 1 and 2. However, the adhesion to diorite for the binder of the invention is significantly improved when compared to the adhesion for the comparative examples 1 and 2, and is similar to the adhesion achieved with the petroleum product-based commercial binder of comparative example 3.

What is claimed is:

1. A binder composition comprising a resin of vegetable origin, an oil of vegetable origin and a polymer, characterised in that the polymer is functionalised with silane groups.

2. A binder composition according to claim 1, wherein the amount of resin is in the range of greater than 20 wt % to less than 90 wt %, based upon the weight of the binder composition.

3. A binder composition according to claim 1, wherein the resin is a rosin ester.

4. A binder composition according to claim 1, wherein the amount of oil is in the range of greater than 10 wt % to less than 80 wt %, based upon the weight of the binder composition.

5. A binder composition according to claim 1, wherein the oil is rapeseed oil, palm oil or tall oil.

6. A binder composition according to claim 1, wherein the polymer is a thermoplastic elastomer or plastomer and the amount of polymer is in the range of greater than 1 wt % to less than 10 wt %.

7. A binder composition according to claim 1, wherein the polymer is functionalized with silanes by grafting with silanes of general formula $RR'_n SiY_{3-n}$, wherein n is 0, 1 or 2, wherein R is a non-hydrolysable organic group which is capable of grafting onto the polymer, wherein R' is a nonhydrolysable organic group incapable of grafting onto the polymer and wherein Y is a hydrolysable organic group.

8. A binder composition according to claim 7, wherein the silane selected from the group consisting of vinyltrimethoxysilane or vinyltriethoxysilane or their mixture.

9. An aqueous emulsion comprising a binder composition according to claim 1, water and one or more additives to assist in the formation and stabilization of the emulsion.

10. A mixture comprising: a binder composition according to claim 1 and aggregate.

11. A binder composition according to claim 2, wherein the resin is a rosin ester.

12. A binder composition according to claim 2, wherein the amount of oil is in the range of greater than 10 wt % to less than 80 wt %, based upon the weight of the binder composition.

13. A binder composition according to claim 3, wherein the amount of oil is in the range of greater than 10 wt % to less than 80 wt %, based upon the weight of the binder composition.

14. A binder composition according to claim 2, wherein the oil is rapeseed oil, palm oil or tall oil.

15. A binder composition according to claim 3, wherein the oil is rapeseed oil, palm oil or tall oil.

16. A binder composition according to claim 4, wherein the oil is rapeseed oil, palm oil or tall oil.

17. A binder composition according to claim 2, wherein the polymer is a thermoplastic elastomer or plastomer and the amount of polymer is in the range of greater than 1 wt % to less than 10 wt %.

18. A binder composition according to claim 3, wherein the polymer is a thermoplastic elastomer or plastomer and the amount of polymer is in the range of greater than 1 wt % to less than 10 wt %.

19. A binder composition according to claim 4, wherein the polymer is a thermoplastic elastomer or plastomer and the amount of polymer is in the range of greater than 1 wt % to less than 10 wt %.

20. A binder composition according to claim 5, wherein the polymer is a thermoplastic elastomer or plastomer and the amount of polymer is in the range of greater than 1 wt % to less than 10 wt %.

21. A binder composition according to claim 2, wherein the polymer is functionalized with silanes by grafting with silanes of general formula $RR'_n SiY_{3-n}$, wherein n is 0, 1 or 2, wherein R is a non-hydrolysable organic group which is capable of grafting onto the polymer, wherein R' is a nonhydrolysable organic group incapable of grafting onto the polymer and wherein Y is a hydrolysable organic group.

22. A binder composition according to claim 3, wherein the polymer is functionalized with silanes by grafting with silanes of general formula $RR'_n SiY_{3-n}$, wherein n is 0, 1 or 2, wherein R is a non-hydrolysable organic group which is capable of grafting onto the polymer, wherein R' is a nonhydrolysable organic group incapable of grafting onto the polymer and wherein Y is a hydrolysable organic group.

23. A binder composition according to claim 4, wherein the polymer is functionalized with silanes by grafting with silanes of general formula $RR'_n SiY_{3-n}$, wherein n is 0, 1 or 2, wherein R is a non-hydrolysable organic group which is capable of grafting onto the polymer, wherein R' is a nonhydrolysable organic group incapable of grafting onto the polymer and wherein Y is a hydrolysable organic group.

24. A binder composition according to claim 5, wherein the polymer is functionalized with silanes by grafting with silanes of general formula $RR'_n SiY_{3-n}$, wherein n is 0, 1 or 2, wherein R is a non-hydrolysable organic group which is capable of grafting onto the polymer, wherein R' is a nonhydrolysable organic group incapable of grafting onto the polymer and wherein Y is a hydrolysable organic group.

25. A binder composition according to claim 6, wherein the polymer is functionalized with silanes by grafting with silanes of general formula $RR'_n SiY_{3-n}$, wherein n is 0, 1 or 2, wherein R is a non-hydrolysable organic group which is capable of grafting onto the polymer, wherein R' is a nonhydrolysable organic group incapable of grafting onto the polymer and wherein Y is a hydrolysable organic group.

26. A mixture comprising: a binder composition according to claim 21 and aggregate.

27. A mixture comprising: a binder composition according to claim 22 and aggregate.

28. A mixture comprising: a binder composition according to claim 23 and aggregate.

29. A mixture comprising: a binder composition according to claim 24 and aggregate.

30. A mixture comprising: a binder composition according to claim 25 and aggregate.

* * * * *